(12) United States Patent
Kliman et al.

(10) Patent No.: US 6,373,921 B1
(45) Date of Patent: Apr. 16, 2002

(54) X-RAY UNIT INCLUDING ELECTROMAGNETIC SHIELD

(75) Inventors: Gerald Burt Kliman; Mohamed Osama, both of Niskayuna, NY (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 09/472,626

(22) Filed: Dec. 27, 1999

(51) Int. Cl.$^7$ ................................................. H02K 5/00
(52) U.S. Cl. ......................... 378/131; 378/142; 310/85; 310/261
(58) Field of Search ................................ 378/131, 121, 378/125, 142; 310/67 R, 85, 261

(56) References Cited

U.S. PATENT DOCUMENTS

| | | |
|---|---|---|
| 4,581,555 A | 4/1986 | Kuznetsov et al. |
| 4,908,347 A | 3/1990 | Denk |
| 5,206,892 A | 4/1993 | Guerin et al. |
| 5,661,353 A | 8/1997 | Erdman et al. |
| 5,821,649 A | 10/1998 | Langhorst |
| 5,821,652 A | 10/1998 | Hyypio |
| 5,925,951 A * | 7/1999 | Edwards et al. .......... 310/68 R |

OTHER PUBLICATIONS

Reliance Electric Cleanroom–Duty Motors with Current Shield Technology, Rockwell Automation Reliance Electric, Motor & Drive Packages for Semiconductor Fabrication Facilities, 1998, 4 Pages.

"Theory and Calculation of Alternating Current Phenomena" by Charles Steinmetz, McGraw Hill Book Company, Inc., 5$^{TH}$ Edition, (1916) Chapter XIII, pp. 136–149.

\* cited by examiner

*Primary Examiner*—Drew Dunn
(74) *Attorney, Agent, or Firm*—Ann M. Agosti; Jill M. Breedlove

(57) ABSTRACT

An X-ray unit includes an X-ray tube including a rotating anode coupled to a rotor and a metal frame enclosing the rotating anode and the rotor. A motor, including the rotor of the X-ray tube, and a stator are situated outside the metal frame while an electromagnetic shield is situated between the stator and the rotor to minimize coupling to the stator of magnetic fields resulting from X-ray tube arcing. In one optional embodiment the electromagnetic shield includes an electrically conductive film situated on an outer diameter of the metal frame, and in another optional embodiment the electromagnetic shield includes an insulating film metallized on one surface with an electrically conductive film.

10 Claims, 3 Drawing Sheets

X-RAY UNIT INCLUDING ELECTROMAGNETIC SHIELD

BACKGROUND

The invention relates generally to X-ray units and more specifically to shielding for X-ray units.

In an X-ray tube, electrons are produced at a cathode by heating a filament. The electrons are attracted to an anode target by a high voltage potential difference (typically about forty to one hundred fifty kilovolts). When the accelerated electrons hit the anode target, X-rays are produced. Only about one percent of the electron energy is converted into X-ray radiation. The remaining energy is converted into heat. To avoid exceeding the melting point of the focal spot on the target where electrons hit, the target is rotated. The higher the target speed, the lower the focal spot temperature. To avoid scattering the electron beam, the cathode and anode are kept in vacuum conditions (typically about $5 \times 10^{-7}$ Torr) within a frame (an X-ray tube).

A "crackle" or "spit" in an X-ray tube occurs when an arc develops within the tube and effectively short circuits the high voltage power supply. Within about two nanoseconds, the results are that the rotor surface experiences a sudden increase in voltage of about seventy-five kilovolts and that a current of about one thousand amperes flows through the center of the rotor. The pulse remains for about one hundred nanoseconds before being extinguished.

When an X-ray tube "crackles," a large current pulse flows axially through the tube, couples to the stator, and can cause damage to electronic components in the associated converter.

Commonly assigned Guerin et al., U.S. Pat. No. 5,206,892 describes X-ray tube "crackling" and several conventional approaches to reducing the effects of crackling. These techniques include using metal frames in combination with filters at the inputs of electronic equipment and mechanically fastening/mounting metal screens between the rotor and stator. The shielding discussed in Guerin et al. is electrostatic shielding. Guerin et al. appears to relate to a glass frame assembly (with a joint apparently melted to the stationary stem) having a conventional insulating bell-shaped part between the X-ray tube frame and the stator. Guerin et al. describes coating the bell-shaped part's outer diameter with a conductive layer to serve as an electrostatic screen and ground-connecting the conductive layer to an X-ray unit housing. In a variant, Guerin et al. describes a metal film being applied to the pre-insulated coil, cable, and magnetic circuit of the stator. In both embodiments, a discontinuity is present for the stated purpose of preventing currents from being induced, in the conductive layer/metal film. The material of the metal film is described as copper, silver, or any other material that is a good conductor of electricity with a thickness range from some micrometers to some tenths of a millimeter.

Erdman et al., U.S. Pat. No. 5,661,353 describes a technique for electrostatically shielding an AC motor wherein capacitive coupling between a stator and a rotor is reduced by positioning an electrically conductive shield therebetween and grounding the shield. Erdman et al. describes the shield as substantially blocking the electric fields produced by charges on the surfaces of the stator windings but allowing the magnetic fields produced by the alternating currents in the stator and rotor windings to pass between the stator and rotor. In one embodiment of Erdman, a plurality of shield members are positioned (and connected) on the internal surfaces of the stator. The shield members are connected to the stator by steel screws or an adhesive and are grounded. In an alternative embodiment of Erdman, a single cylindrical electrostatic shield is used.

SUMMARY

It would be desirable to have an improved design for X-ray unit shielding. In Guerin et al., it was not recognized that electrostatic effects are not the only result of crackling, and, because of the discontinuity in the films, shielding against magnetic fields cannot be effectively accomplished. Similarly, Erdman et al. does not describe magnetic shielding. Although an electrostatic screen was a significant improvement over the prior art at the time of Guerin et al., the inventors of the present invention have since discovered that crackling results in electromagnetic as well as electrostatic effects.

Absent shielding, both electric and magnetic fields couple from the X-ray tube to the stator as a result of crackling. In metal frame X-ray tubes (as compared with glass frame X-ray tubes), the metal frame itself will serve as a reasonable electrostatic shield but will not effectively exclude magnetic fields.

The large current pulse that results from crackling creates a circumferential magnetic field pulse which will- not be shielded by a non-magnetic frame. The magnetic field pulse will couple with the stator winding and induce a current pulse in the stator. This current pulse can travel through cabling back to the power electronic converter(s).

In accordance with one embodiment of the present invention, an electric machine comprises a rotor, a stator, and an electromagnetic shield situated between the stator and the rotor to minimize coupling to either one of the stator or the rotor of high frequency magnetic fields resulting from the other of the stator or the rotor with minimal influence on electromagnetic coupling at electric drive frequencies.

In accordance with another embodiment of the present invention, an X-ray tube comprises: a rotor; a rotating anode coupled to the rotor; a metal frame enclosing the rotating anode and the rotor; and an electromagnetic shield comprising an electrically conductive film situated on an outer diameter of the metal frame for shielding magnetic fields resulting from X-ray tube arcing.

BRIEF DESCRIPTION OF THE DRAWINGS

The features of the invention believed to be novel are set forth with particularity in the appended claims. The invention itself, however, both as to organization and method of operation, together with further objects and advantages thereof, may best be understood by reference to the following description taken in conjunction with the accompanying drawings, where like numerals represent like components, in which:

DETAILED DESCRIPTION OF THE INVENTION

Figure 1:
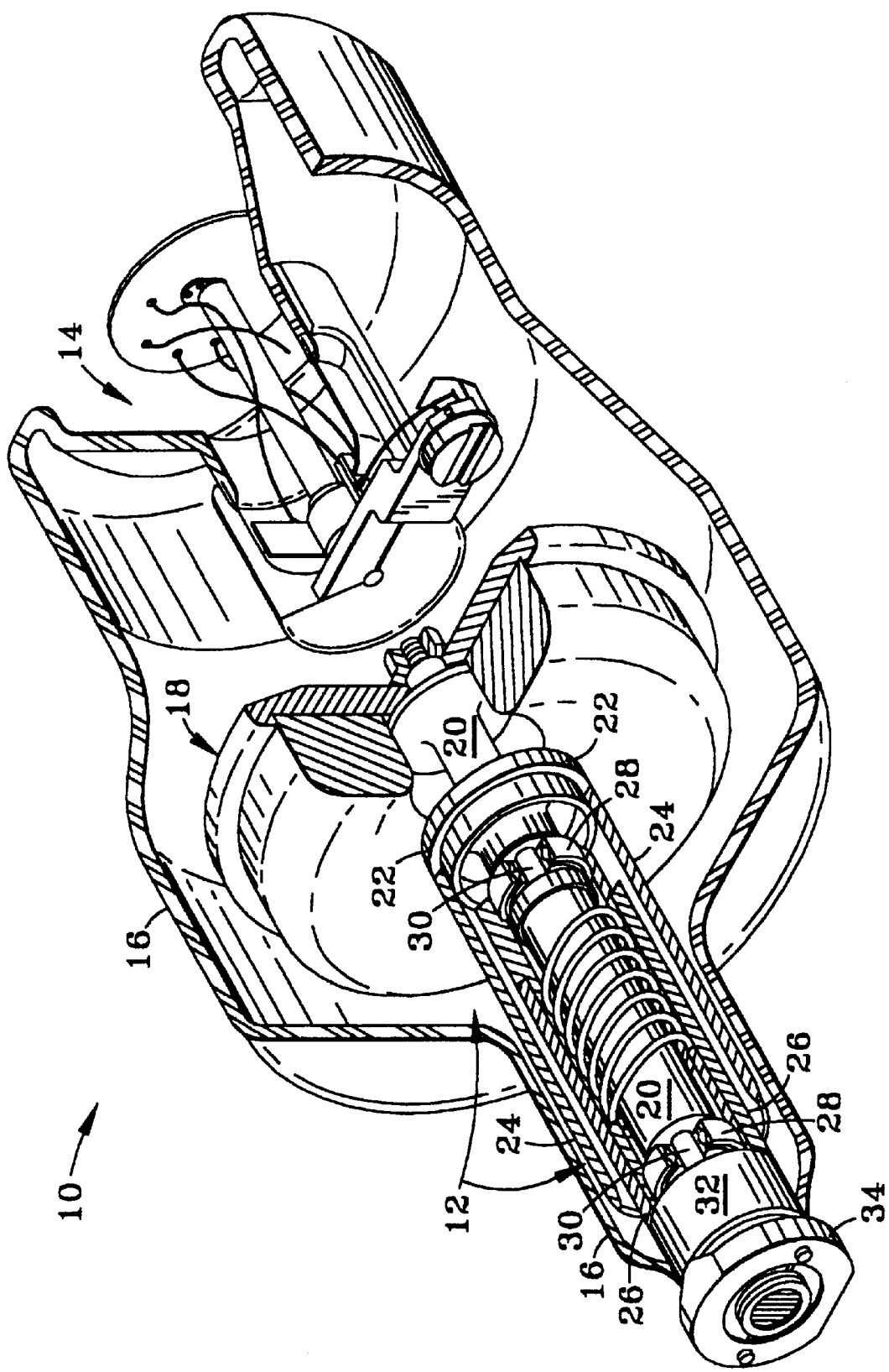
FIG. 1 is a perspective view of a conventional X-ray tube (stator not shown).

FIG. 1 is a perspective view of a conventional X-ray tube 10 including an anode assembly 12 and a cathode assembly 14 enclosed within a frame 16. Anode assembly 12 includes an anode target 18, a rotatable shaft 20, a rotor hub 22 attaching a rotor 24 to the rotatable shaft, a stationary shaft 26 (sometimes referred to as a "stem"), rotating element bearing 28 situated in rotor shaft grooves 30, and a stem ring 32 connecting stationary shaft 26 to a connector 34 which transfer electrical current from the stationary shaft.

Although embodiments of the present invention are described below in terms of an X-ray unit wherein the stator is shielded from magnetic fields resulting from X-ray tube arcing, the invention is additionally applicable to other systems wherein shielding the stator or rotor from high frequency magnetic fields is desirable. These high frequency magnetic fields can range from hundreds of kilo-Hertz to tens of giga-Hertz.

Figure 2:
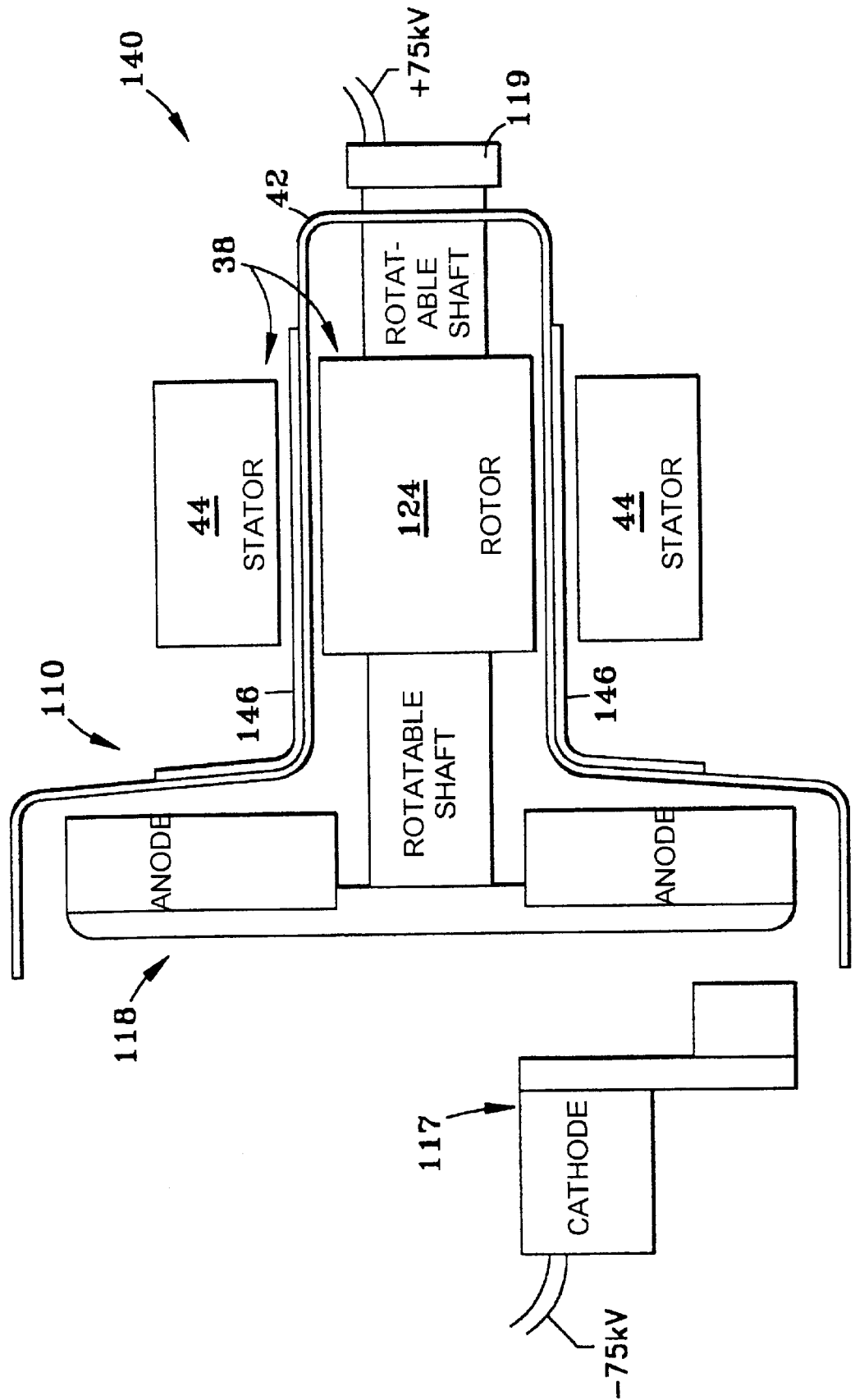
FIG. 2 is a schematic side view of an X-ray unit including an electromagnetic shield according to one embodiment of the present invention.
Figure 3:
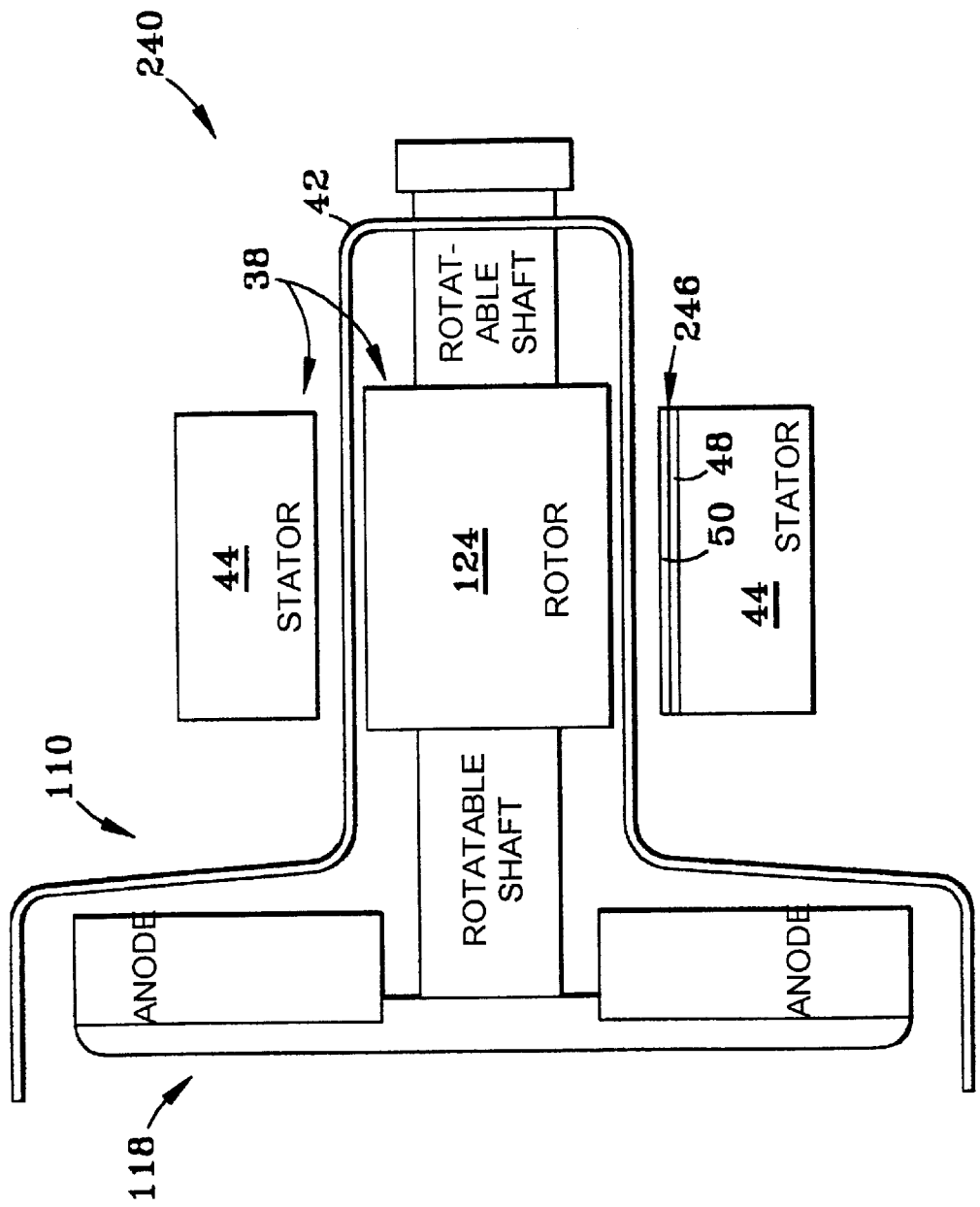
FIG. 3 is a schematic side view of an X-ray unit including an electromagnetic shield according to another embodiment of the present invention.

FIGS. 2–3 are schematic side views of an X-ray unit including electromagnetic shields according to two embodiments of the present invention. In each of FIGS. 2–3 an X-ray unit 140 or 240 comprises an X-ray tube 110 including a rotating anode 118 coupled to a rotor 124 and a frame 42 enclosing the rotating anode and the rotor, a motor 38 including the rotor of the X-ray tube and a stator 44 situated outside the frame, and an electromagnetic shield 146 or 246 situated between the stator and the rotor to minimize coupling to the stator of magnetic fields resulting from X-ray tube arcing.

A discharge current pulse or arc (referred to as crackling) within X-ray tube 110 can either be between (1) a cathode 117 (typically at −75 kV) and anode 118 (typically at +75 kV), or (2) either the cathode or anode and frame 42 (at ground). Case (1) is commonly referred to as a "spit" and typically results in high frequency magnetic fields that are greater than about 30 megaHertz. In case (2) the anode and cathode overcurrents are not equal.

The discharge current pulse typically has a magnitude of around 1000A with a rise time of a nanosecond and travels axially through anode 118 (including rotor 124) to a high voltage (HV) connector 119 and then to a HV generator (not shown). The current pulse results in both a magnetic field in the circumferential direction and an electric field in the radial direction.

Magnetic fields are circumferential about the axis of the rotor. For stator shielding, fields of concern extend to a diameter that is equal to or greater than the inner diameter of the stator.

Ampere's law governs the magnetic field intensity resulting from crackling:

$$\nabla \times H = J_s + J_e + J_d,$$

wherein H represents magnetic field intensity, $J_s$ represents the current density due to an electric potential difference, $J_e$ represents the induced eddy current density due to time varying magnetic field, and $J_d$ represents the displacement current density due to the time varying electric fields.

The eddy currents $J_e$ on the inner and outer surface of the frame form a complete loop and thus are in opposite directions resulting in no net effect on magnetic field intensity at radii larger than frame's outer diameter. The displacement current densities $J_d$ are in the radial direction and flow from the rotor surface and terminate at the frame in embodiments with grounded metal frame tubes. Hence, $J_e$ and $J_d$ do not influence the magnetic field outside a grounded metal frame tube.

$J_s$ flows in the axial direction and includes both the crackling current in the rotor as well as ground currents flowing through the frame. For embodiments wherein frame 42 comprises a metal, very high frequency axial currents are induced in the surface of the frame resulting in a reduction of the magnetic field within the frame.

In order for the metal frame to provide 100% magnetic shielding, net current flowing in the frame should be equal in magnitude and opposite in direction to the crackling current in the rotor.

In an embodiment wherein frame 42 comprises non-magnetic steel (typically stainless steel), the surface resistivity is $$R_{sfr} = \sqrt{\frac{\pi f \mu_0}{\sigma_{ss}}}$$

or 56.4 milli-ohms for a frequency f=1 GHz, and temperature T=50° C. A typical frame with an axial length of about $l_{fr}$=100 mm and a diameter of about $D_{fr}$=90 mm has a resistance of $$R_{fr} = l_{fr} \frac{R_{sfr}}{\pi D_{fr}} = 20.0 \text{ milli-ohms.}$$

This value is typically too large to allow for the total crackling current value to flow and thus although the crackling-induced magnetic field outside the frame is attenuated, considerable coupling to the stator windings is expected to occur.

By situating an electrically conductive film between the stator and rotor (and, in one embodiment, on an outer diameter of the frame), a parallel path can be provided. As an example for a copper electrically conductive film, at frequency f=1 GHz, and temperature T=50° C., copper has a skin depth $$\delta_{Cu} = \frac{1}{\sqrt{\pi f \mu_0 \sigma_{Cu}}} = 2.2 \text{ micrometers.}$$

Thus a five micrometer thickness of copper would be sufficient for the electromagnetic shield. The electromagnetic shield surface resistivity in this example is $$R_{ssh} = \sqrt{\frac{\pi f \mu_0}{\sigma_{Cu}}} = 8.6 \text{ milli-ohms.}$$

For the above example, an electromagnetic shield with an axial length $l_{sh}$=50 mm and a diameter of $D_{sh}$=92 mm, has a resistance of only $$R_{sh} = l_{sh} \frac{R_{ssh}}{\pi D_{sh}} = 1.5 \text{ milli-ohms.}$$

Thus the magnetic shield provides an additional parallel path for surface currents with lower surface resistance than the frame. This is expected to provide further attenuation of the crackling-induced magnetic field coupling to the stator.

As discussed above, in one embodiment, frame 42 comprises a metal frame. Typical metal frame material includes stainless steel (which is non-magnetic) and INCONEL™ (a trademark of Inco International, Inc. of Huntington, WV, for a corrosion-resistant alloy containing primarily nickel, chromium, and iron). A metal frame is useful because the electrostatic shielding function discussed in aforementioned Guerin et al. is at least partially performed by the metal frame. Thus, electrostatic shielding is in place and the thickness of the electromagnetic shield need only be sufficient to provide magnetic shielding in the desired frequency range with almost no undesired effect on motor performance. The appropriate thickness can be determined as described above. It is expected that thicknesses of about one to about ten micrometers will typically be used. Fundamental drive frequencies of X-ray motors are less than 1 kHz while switching frequencies are typically a few kHz. The time rate of change of crackling current is larger than 30 MHz, typically around 1 GHz. As long as the electromagnetic shield thickness is not much larger than sufficient for shielding the crackling currents frequencies, there will be negligible extra losses in the shield due to the electric drive frequencies (fundamental and switching harmonics), and the fundamental frequency air gap fields responsible for energy conversion will be minimally effected. In one embodiment, the electromagnetic shield 146 or 246 comprises an electrically conductive material such as copper, silver, or gold. In a more specific embodiment, the electromagnetic shield comprises copper having a thickness of less than or equal to about five micrometers.

The length of the electromagnetic shield in one embodiment is at least as long as the longer of the stator and rotor. In some embodiments the length of the electromagnetic shield will extend past the end windings (not shown) of the stator.

In the embodiment of FIG. 2, the electromagnetic shield 146 comprises an electrically conductive film situated on an outer diameter of frame 42. For metal frame tubes, where the frame functions as an electrostatic shield, it is not necessary to ground the electromagnetic shield.

In the embodiment of FIG. 3, the electromagnetic shield 246 comprises an insulating film 48 metallized on one surface with an electrically conductive film 50 and situated with the other surface facing an inner diameter of the stator. Insulating film 48 may comprise a material such as Mylar or an oxide coating on the inner diameter of the stator.

If desired, a glass frame can be used instead of a metal frame, particularly in the embodiment of FIG. 3. If an electromagnetic shield is used in a glass frame, such use can be in conjunction either with a separate electrostatic shield or as a combination shield for electric and magnetic fields. If a combination shield is used, the shield will be coupled to ground to prevent electrostatic coupling.

While only certain features of the invention have been illustrated and described herein, many modifications and changes will occur to those skilled in the art. It is, therefore, to be understood that the appended claims are intended to cover all such modifications and changes as fall within the true spirit of the invention.

What is claimed is:

1. An X-ray unit comprising:
    an X-ray tube including a rotating anode coupled to a rotor and a metal frame enclosing the rotating anode and the rotor;
    a motor including the rotor of the X-ray tube and a stator situated outside the metal frame; and
    an electromagnetic shield situated between the stator and the rotor to minimize coupling to the stator of high frequency magnetic fields resulting from X-ray tube arcing.

2. The X-ray unit of claim 1 wherein the electromagnetic shield comprises an electrically conductive film situated on an outer diameter of the metal frame.

3. The X-ray unit of claim 2 wherein a thickness of the electrically conductive film ranges from about one to about ten micrometers.

4. The X-ray unit of claim 1 wherein the electromagnetic shield comprises an insulating film metallized on one surface with an electrically conductive film and situated with the other surface facing an inner diameter of the stator.

5. The X-ray unit of claim 4 wherein a thickness of the electrically conductive film ranges from about one to about ten micrometers.

6. The X-ray unit of claim 1 wherein the electromagnetic shield is adapted to minimize coupling to the stator of magnetic fields having frequencies greater than about thirty megaHertz.

7. An X-ray tube comprising:
    a rotor;
    a rotating anode coupled to the rotor;
    a metal frame enclosing the rotating anode and the rotor; and
    an electromagnetic shield comprising an electrically conductive film situated on an outer diameter of the metal frame for shielding magnetic fields resulting from X-ray tube arcing.

8. The X-ray tube of claim 7 wherein the electrically conductive film comprises copper having a thickness of less than or equal to about five micrometers.

9. An X-ray unit comprising:
    an X-ray tube including a rotating anode coupled to a rotor and a frame enclosing the rotating anode and the rotor;
    a motor including the rotor of the; X-ray tube and a stator situated outside the frame; and
    an electromagnetic shield situated between the stator and the rotor to minimize coupling to the stator of high frequency magnetic fields resulting from X-ray tube arcing, the electromagnetic shield comprising an insulating film metallized on one surface with an electrically conductive film and situated with the other surface facing an inner diameter of the stator.

10. The X-ray unit of claim 9 wherein the electromagnetic shield is adapted to minimize coupling to the stator of magnetic fields having frequencies greater than about thirty megaHertz.

* * * * *